United States Patent [19]

Boggs et al.

[11] Patent Number: 5,236,884
[45] Date of Patent: Aug. 17, 1993

[54] THERMAL IMAGING METHODS AND MATERIALS

[75] Inventors: Roger A. Boggs, Wayland, Mass.; Richard L. Cournoyer, San Jose, Calif.; Ernest W. Ellis, Leverett, Mass.; Sandra E. Russo-Rodriguez, Englewood, Colo.; Stephen J. Telfer, Arlington, Mass.; David P. Waller, Lexington, Mass.; Michael J. Zuraw, Arlington, Mass.

[73] Assignee: Polaroid Corporation, Cambridge, Mass.

[21] Appl. No.: 696,151

[22] Filed: May 6, 1991

[51] Int. Cl.$^5$ .............................................. B41M 5/30
[52] U.S. Cl. .................................. 503/201; 430/200; 503/217; 503/218; 503/226
[58] Field of Search ............... 503/201, 202, 216–218, 503/226; 430/200

[56] References Cited

U.S. PATENT DOCUMENTS 3,409,457  11/1968  Menzel ..................... 117/36.8
4,602,263   1/1986  Borror et al. ............... 346/201
4,720,449   1/1988  Borror et al. ............... 430/338

FOREIGN PATENT DOCUMENTS 57-46239  3/1982  Japan .

OTHER PUBLICATIONS

Vyas, K., Manohar, H., and Venkatesan, K., J. Phys. Chem., 94(15), 6069–73 (1990).
Stoss, P. and Satzinger, G., Chem. Ber., 111(4), 1453–63 (1978).
Stetter, H. and Jonas, F., Tetrahedron Lett., 22(49), 4945–8 (1981).
Nikishin, G. I., Troyansky, E. I., Svitanko, I. V., and Chizhov, O. S., Tetrahedron Lett., 25(1), 97–8 (1984).
Mannschreck, A. and Dvorak, H., Tetrahedron Lett., (8), 547–50 (1973).
Wachsen, E. and Hartke, K., Chem. Ber., 108(2), 683–92 (1975).
L'Abbe, G., Mathys, G. and Toppet, S., J. Org. Chem. 39(23), 3449–51 (1974).

Primary Examiner—Pamela R. Schwartz
Attorney, Agent, or Firm—Carol A. Loeschorn

[57] ABSTRACT

Leuco dyes are provided which comprise the coupling product of a N-acyl substituted aromatic amino color developer and a dye-forming coupler moiety substituted at the coupling carbon with a thermally removable leaving group. Thermal imaging systems employing these leuco dyes have the advantage of reduced bubble formation relative to thermal imaging systems employing prior art leuco dyes containing a group which thermally fragments into one or more gases.

25 Claims, No Drawings

THERMAL IMAGING METHODS AND MATERIALS

REFERENCES TO RELATED APPLICATIONS

Copending application Ser. No. 07/548,223 filed Jun. 29, 1990 by L. D. Taylor and D. P. Waller and assigned to the same assignee as the present application, describes and claims leuco dyes which generate a dye upon application of heat.

Copending application Ser. No. 07/277,014 filed Nov. 28, 1988 by Roger A. Boggs et al, (now abandoned and replaced by copending U.S. patent applications Ser. Nos. 07/729,420 (now U.S. Pat. No. 5,192,645) and 07/729,426, bow filed on Jul. 12, 1991), and assigned to the same assignee as the present application, describes and claims leuco dyes which generate a dye upon the application of heat.

BACKGROUND OF THE INVENTION

1. Field of the Invention

This invention relates to heat-sensitive recording elements particularly useful for making color hard copy, to a method of imaging employing said elements and to novel leuco dyes (the term "leuco dye" is used herein to refer to a substantially colorless compound which generates a colored material upon heating) and the dyes derived therefrom useful as the color image-forming materials.

2. Description of the Relevant Art

Leuco dyes have been suggested which become irreversibly colored by the loss of a single group. For example, Japanese Patent Kokai No. 57-46239, Laid Open Mar. 16, 1982, discloses colorless indoaniline compounds which possess an alkyl/aryl sulfonyl group that irreversibly cleaves from the molecule upon exposure to light, usually ultraviolet light, with the result that the compound is converted to its colored form. U.S. Pat. No. 3,409,457 to Karl-Heinz Menzel discloses leuco dyes which possess an acylamino group that cleaves from the molecule upon heating to yield a colored azomethine dye. The conversion of these leuco compounds into the azomethine dyes is accelerated by using alkalis such as alkali alcoholates. The acylamino and alkyl/aryl sulfonyl groups employed in the compounds of these references depart from the molecule to effect conjugation and form a dye chromophore.

U.S. Pat. No. 4,720,449 to Alan L. Borror and Ernest W. Ellis discloses colorless di- and tri-arylmethane compounds possessing a masked acylation substituent which undergoes irreversible fragmentation upon heating to liberate the acyl group for effecting an intramolecular acylation reaction whereby the compounds are rendered colored.

The copending application Ser. No. 07/548,223 of L. D. Taylor and D. P. Waller describes and claims leuco dyes comprising mixed carbonate esters of quinophthalone dyes and tertiary alkanols containing not more than about 9 carbon atoms. Application of heat to the leuco dyes causes the breakdown of at least one carbonate ester grouping in the mixed ester, whereby the compounds are rendered colored. The preferred esters are the tertiary-butoxycarbonyl (hereinafter t-Boc) derivatives.

U.S. Pat. No. 4,602,263 to Alan L. Borror, Ernest W. Ellis and Donald A. McGowan discloses the stabilization of a leuco dye by employing a tertiary-alkoxycarbonyl group, for example, t-Boc as a thermally removable protecting group. This protecting group is removed by unimolecular fragmentation upon heating, which fragmentation reaction is irreversible. Copending U.S. Patent Application of Roger Boggs, et al (Ser. No. 07/277,014, now abandoned and replaced by copending U.S. patent application Ser. Nos. 07/729,420 (now U.S. Pat. No. 5,192,645) and 07/729,426, both filed on Jul. 12, 1991), discloses leuco dyes which upon the application of heat become irreversibly colored by the loss of a leaving group and a thermally removable protecting group. Both the leaving group and the thermally removable protecting group are required to stabilize the colorless leuco dyes until the application of heat.

The thermally removable protecting groups employed in the above identified U.S. Pat. No. 4,602,263 and copending U.S. Patent Application of Roger Boggs, et al (Ser. No. 07/277,014, now abandoned and replaced by copending U.S. patent application Ser. Nos. 07/729,420 (now U.S. Pat. No. 5,192,645) and 07/729,426, both filed on Jul. 12, 1991) and the esters in the above-identified copending application, Ser. No. 07/548,223, undergo fragmentation. This fragmentation involves the formation of one or more gases (i.e., compounds which exist as gases at room temperature and atmospheric pressure), e.g., when t-Boc is employed as the thermally removable protecting group or as the preferred ester it undergoes thermal fragmentation to liberate two gases, i.e., carbon dioxide and isobutylene. These gases become trapped within the imaging system in the form of bubbles. Bubbles are undesirable because they cause light scattering and consequently impair image quality by producing areas which appear dark in transmitted light.

The present invention provides leuco dyes and methods and materials for thermal imaging which have the significant advantage of reduced bubble formation.

SUMMARY OF THE INVENTION

This invention provides leuco dyes which comprise the coupling products of a N-acyl substituted aromatic amino color developer and a dye-forming coupler moiety substituted at the coupling carbon with a thermally removable leaving group. These leuco dyes may be represented by

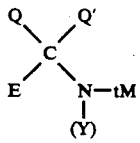

wherein:
E represents a thermally removable leaving group;
tM represents a thermally migratable acyl group;
Q, Q' and C taken together represent a dye-forming coupler moiety wherein C is the coupling carbon of said coupler moiety; and,
(Y) taken together with N represents an aromatic amino color developer moiety,
one of said Q, Q' and (Y) containing an atom selected from the atoms comprising Group 5A/Group 6A of the Periodic Table, said groups E and tM maintaining said leuco dye in a substantially colorless form until the application of heat causes said group E to be eliminated from said leuco dye and said group tM to migrate from said N atom to said Group 5A/Group 6A atom thereby forming a dye represented by

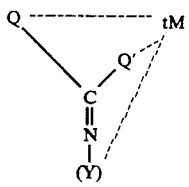

wherein said dotted lines indicate that said tM group is bonded to said Group 5A/Group 6A atom in one of said Q, Q' and (Y).

This invention also provides a heat-sensitive recording element which comprises a support carrying at least one layer of the aforementioned leuco dyes.

This invention additionally provides a method of thermal imaging which comprises heating imagewise a heat-sensitive element comprising a support carrying at least one layer of the aforementioned leuco dyes, thereby causing, in the heated areas, the elimination of the thermally removable leaving group and the thermal migration of the acyl group, whereby the leuco dye is converted into a colored dye of this invention in an imagewise pattern corresponding to the imagewise heating.

This invention also provides the aforementioned dyes.

DETAILED DESCRIPTION OF THE INVENTION

The leuco dyes of the present invention, as mentioned above, comprise the coupling products of an N-acyl substituted aromatic amino color developer and a dye-forming coupler moiety substituted at the coupling carbon with a thermally removable leaving group. The leuco dyes may be represented by:

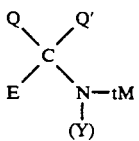

wherein:
E represents a thermally removable leaving group;
tM represents a thermally migratable acyl group;
Q, Q' and C taken together represent a dye-forming coupler moiety wherein C is the coupling carbon of said coupler moiety;
and,
(Y) taken together with N represents an aromatic amino color developer moiety,
one of said Q, Q' and (Y) containing an atom selected from the atoms comprising Group 5A/Group 6A of the Periodic Table, said groups E and tM maintaining said leuco dye in a substantially colorless form until the application of heat causes said group E to be eliminated from said leuco dye and said group tM to migrate from said N atom to said Group 5A/Group 6A atom thereby forming a dye represented by

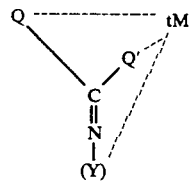

wherein said dotted lines indicate that said tM group is bonded to said Group 5A/Group 6A atom in one of said Q, Q' and (Y). Group 5A/Group 6A atoms may be, for example, nitrogen, oxygen and sulfur, the preferred atom being nitrogen.

As described above, the thermally migratable acyl group (tM), upon the application of heat, migrates from its original nitrogen atom to a Group 5A/Group 6A atom contained within one of said group Q, group Q' and said group (Y) of the leuco dye. The tM group may be represented by the structural formula

wherein R is alkyl usually having 1 to 12 carbon atoms such as methyl, isopropyl, and hexyl; cycloalkyl such as cyclopentyl and cyclohexyl; aryl such as phenyl; aralkyl such as benzyl and phenethyl; alkaryl such as methylphenyl and ethylphenyl; heterocyclic such as pyridine, quinolidine, pyran, thiophene and furan; and,

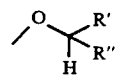

wherein R' and R", the same or different, are selected from hydrogen; alkyl usually having 1 to 12 carbon atoms such as methyl, isopropyl, and hexyl; cycloalkyl such as cyclopentyl and cyclohexyl; aryl such as phenyl; aralkyl such as benzyl and phenethyl; alkaryl such as methylphenyl and ethylphenyl; heterocyclic such as pyridine, quinolidine, pyran, thiophene and furan.

The thermally removable leaving group, E, may be any leaving group that is nucleofugal, i.e., a leaving group which departs with the bonding electron pair. Such leaving groups must necessarily be capable of stabilizing the electron pair once the leaving group has been eliminated. Thus, it will be clear to one skilled in the art that hydrogen is not a nucleofugal leaving group. Nucleofugal leaving groups are well known and have been discussed by Charles J. M. Stirling, Acc. Chem. Res., 12, 198 (1979) and by Charles J. M. Stirling, et al., J. Chem. Commun., 940 (1975). Examples of leaving groups that can be employed in the present invention include heterocycles such as imidazolyl or

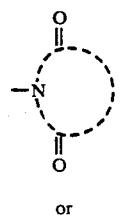

or

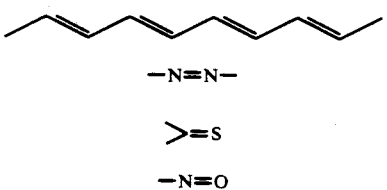

halo such as chloro; hydroxy; SOR'''; SOAr; —SR'''; —SO₂R'''; —SAr; —SO₂Ar; —SeAr; —OAr; —OR'''; P(O)(OR''')₂; —C(R''')₂EW; —C(R''')(EW)₂; —CH(EW)₂; —N(R''')Ar; —N(Ar)Ar; —N(Ar)CO2CH₂Ar; and —N(R''')CO₂Ar wherein EW represents an electron-withdrawing group, R''' is alkyl and Ar is aryl, usually phenyl, unsubstituted or substituted with one or more substituents, e.g., alkyl, alkoxy, halo, carboxy, nitro, cyano, —SO₂alkyl, —SO₂phenyl, tosyl and N,N-(dialkyl)amino wherein said alkyl usually contain 1 to 6 carbon atoms. As used herein and as is well known in the art, an electron withdrawing group is a group having a positive sigma value according to Hammett's equation. The preferred leaving groups are phenoxy, unsubstituted or substituted with one or more groups, for example, alkyl usually having 1 to 20 carbon atoms, and carboalkoxy usually having 1 to 20 carbon atoms.

As described by Nassau, K. in *The Physics and Chemistry of Color*, John Wiley and Sons, New York. 1983. p.110, a dye is defined as a "color-producing chromogen, which is composed of a basic chromophore ("colorbearing") group, not necessarily producing color, to which is attached a variety of subsidiary groups, named auxochromes ("color increasers"), which lead to the production of color. Chromophores include carbon-carbon double bonds, particularly in conjugated systems containing alternating single and double bonds as in the carbon chain, structure (6-1), as well as in the azo group, structure (6-2), thio group, structure (6-3), and nitroso group, structure (6-4), among others.

$$\diagup\!\!\diagdown\!\!\diagup\!\!\diagdown\!\!\diagup\!\!\diagdown\!\!\diagup\!\!\diagdown \quad (6\text{-}1)$$

$$-N=N- \quad (6\text{-}2)$$

$$>=S \quad (6\text{-}3)$$

$$-N=O \quad (6\text{-}4)$$

Auxochromes include groups such as —NH₂, —NR₂ where R represents an organic group, —NO₂, —CH₃, —OH, —OR, —Br, —Cl, and so on. We now recognize that some of these auxochromes are electron donors, such as —NH₂, and some are electron acceptors, such as —NO₂ or —Br." For a further discussion of the auxochromophoric system of dyes, see Gilman, H., *Organic Chemistry, An Advanced Treatise*, Vol. 111, John Wiley & Sons, N.Y., 1953, pp. 247–55; and Venkataraman, K., *The Chemistry of Synthetic Dyes*, Vol. I, Academic Press, Inc., New York, 1952, pp. 323–400. The term "color" is used herein to mean "absorbing electromagnetic radiation of a particular wavelength" and does not necessarily refer to visible radiation. Thus, a colored dye of this invention includes a material which absorbs infrared or ultraviolet radiation.

The thermally removable leaving group (E) and the thermally migratable acyl group (tM) are positioned on the leuco dyes of the present invention in the manner described above so as to interrupt the conjugation of the colored auxochromophoric system and render it substantially colorless. Said tM and said E are required to stabilize the colorless form until the application of heat causes the conversion into dyes. This conversion from the colorless to the colored form is achieved by the thermally induced elimination of group E and the migration of group tM from its original position on the nitrogen atom of the developer moiety to some other Group 5A/Group 6A atom contained within the leuco dye, thereby effecting conjugation in the chromophore position to generate a dye and hence color formation.

To avoid premature coloration under normal storage and handling conditions, E and tM are selected such that said Group E is eliminated and group TM migrates substantially from the leuco dye only at an elevated temperature.

It is well known in the photographic art that color developers are oxidized and react with dye-forming couplers to form a wide variety of colors. The dye-forming coupler moieties, of the present invention, in the above formulae, represented by

may be monomeric or polymeric and may be any of those coupler moieties known in the art to form a colored reaction product with an oxidized color developer. Q and Q' represent the groups attached to the coupling carbon C, necessary to complete the dye-forming coupler moiety. Q and Q' may be independent of each other or together may represent a ring forming system to complete the dye-forming coupler moiety.

Examples of coupler moieties that may be used for yellow dye-forming compounds are those derived from acylacetanilides such as benzoylacetanilides and particularly pivaloylacetanilides and variations of pivaloylacetanilides. Coupler moieties that may be used for magenta dye-forming compounds are those derived from pyrazolotriazoles, indazolones, pyrazolobenzimidazoles, and particularly, pyrazolones such as 1-aryl-5-pyrazolones. Coupler moieties that may be used for cyan dye-forming compounds are those derived from substituted phenols or substituted naphthols, particularly 2-carbonamidophenols and 1-hydroxy-2-naphthamides. As noted above, the formation of image dyes by the reaction between a color-forming coupler and the oxidation product of a color developer in color photographic processes is well known, and a review of these color-forming reactions and color couplers useful therein is found in James, T. H., *The Theory of the Photographic Process*, fourth ed., MacMillan Publishing Co., Inc., New York, 1977, pp. 335–362.

The color developer moiety of the present invention may be any of the aromatic amino color developer moieties known or used in the photographic art to form a colored reaction product with a dye-forming coupler. The preferred color developer moieties are the p-phenylenediamines represented by the structural formula

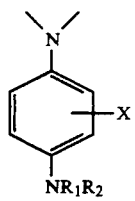

wherein $R_1$ and $R_2$ are each selected from hydrogen, alkyl, cycloalkyl, aryl, alkaryl, aralkyl, hydroxy substituted alkyl, sulfonamido substituted alkyl and alkoxy alkyl and is preferably lower alkyl containing 1 to 6 carbon atoms; and X is hydrogen, alkyl, or substituted alkyl, e.g., hydroxy or amino substituted alkyl, aryl, alkaryl, aralkyl, sulfo, carboxy, sulfonamido, and hydroxy. Particularly preferred color developer moieties are the N,N-dialkyl-p-phenylenediamines, especially the N,N-diethyl-p-phenylenediamines. Other useful color developer moieties include p-aminophenols and certain amino-substituted heterocyclic compounds, e.g., aminopyrazoline and aminohydroxypyrazoles. A review of color developers useful in color-forming reactions can be found in the above referenced James, T. H., *The Theory of the Photographic Process*, fourth ed., MacMillan publishing Co., Inc., New York, 1977, pp. 335-362.

As stated above, the leuco dye of the present invention must contain a Group 5A/Group 6A atom within either the dye-forming coupler moiety or the color developer moiety to which the thermally migratable acyl group is capable of migrating. Thermally induced acyl migrations to and from combinations of Group 5A and Group 6A atoms are known to occur. Examples of such migrations have been described, for example, by Vyas, K., Manohar, H., and Venkatesan, K., J. Phys. Chem., 94(15), 6069-73 (1990) whereby salicylamides undergo a thermally induced [1,5] O to N acyl migration. A [1,5] migration is one in which the migrating group migrates to an atom located 5 atoms away from the atom where the migrating group was originally positioned. Stoss, P. and Satzinger, G., Chem. Ber., 111(4), 1453-63 (1978) describe a thermally induced [1,5] N to N acyl migration in dibenzothiazepine imide oxides. Other thermally induced acyl migrations among and between Group 5A and 6A atoms have been described including [1,2], [1,3] and [1,5] migrations.

Illustrative coupler moieties containing a Group 5A/Group 6A atom which may be used for the yellow dye-forming compounds of the present invention include those couplers having the structural formula

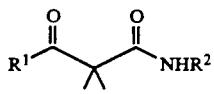

wherein $R^1$ is selected from $(CH_3)_3C-$, $CH_3OCH_2(CH_3)_2C-$, $C_6H_5O(CH_3)_2C-$ and phenyl, unsubstituted or substituted with one or more groups selected from alkyl, alkoxy, nitro, halo such as chloro, and carbonamido; $R^2$ is phenyl, unsubstituted or substituted with one or more groups selected from alkyl, alkoxy, nitro, halo such as chloro, and carbonamido, said phenyl group $R^2$ being the same or different from said phenyl group $R^1$; and N is the requisite Group 5A atom.

Illustrative dye-forming coupler moieties containing a Group 5A/Group 6A atom which may be used for the magenta dye-forming compounds of the present invention include

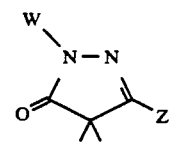

wherein W is selected from benzimidazolyl and phenyl, unsubstituted or substituted with one or more groups selected from alkyl, alkoxy, amino, amino substituted with phenyl or substituted with one or two alkyl groups and halo such as chloro; and, Z represents an organic side chain containing a Group 5A/Group 6A atom to which said tM can migrate. The preferred Group 5A/Group 6A atom is nitrogen and representative Z groups containing nitrogen include $-(CH_2)_xNHR^3$, amino, amino substituted with one phenyl or with one alkyl group, heterocyclic amino, carbonamido, sulfonamido, guanidino ($N=C(NH_2)NHR$), and ureido (NHCONHR) wherein x is 0, 1, 2, or 3 and $R^3$ is hydrogen, alkyl or aryl.

Illustrative coupler moieties containing the requisite Group 5A/Group 6A atom which may be used for the cyan dye-forming compounds are represented by

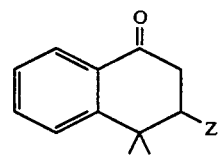

wherein Z has the same meaning as above.

Illustrative color developer moieties containing a Group 5A/Group 6A atom which may be used in the present invention include those represented by the formula

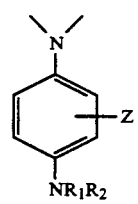

wherein $R_1$, $R_2$ and Z have the same meaning as above and preferably, Z is positioned ortho to the nitrogen atom of the color developer moiety which is directly attached to the coupler carbon.

Illustrative leuco dyes of the present invention and the dyes obtained upon heating them are shown below:

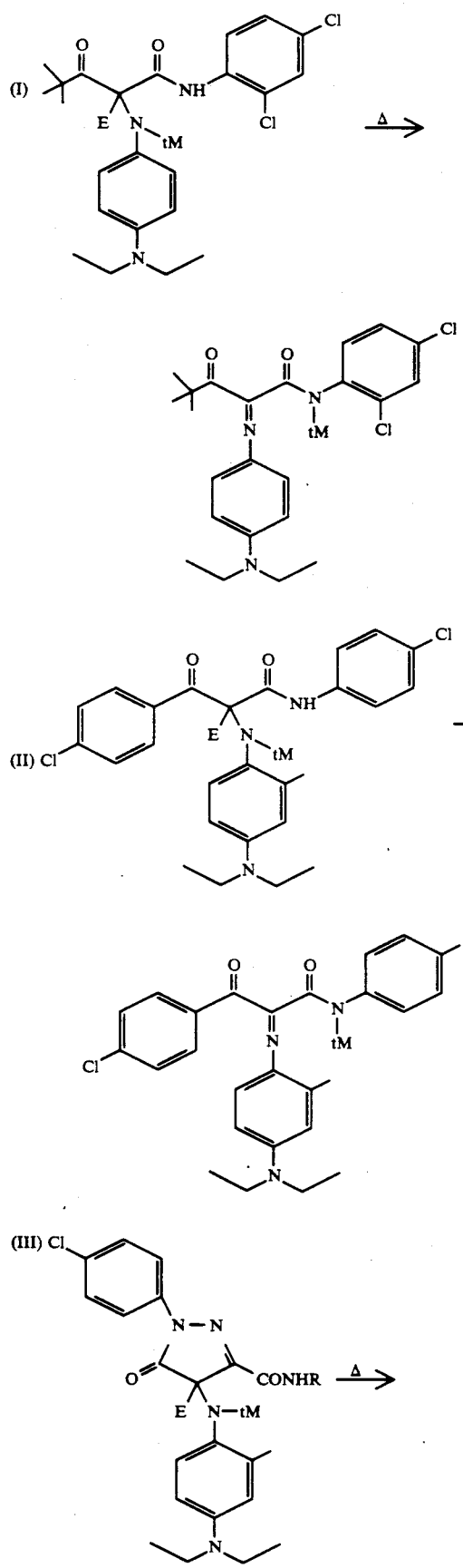

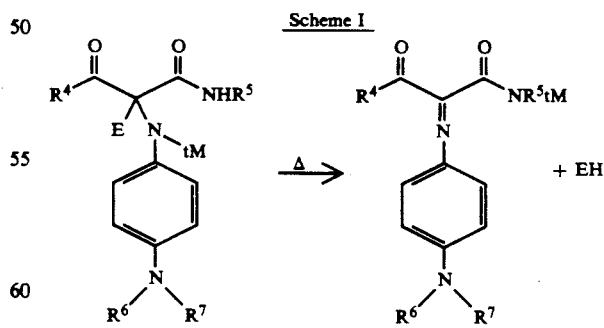

In a preferred embodiment, the leuco dyes of the present invention and the novel image dyes derived therefrom, upon heating, may be represented as in Scheme I:

wherein $R^4$ is a tertiary butyl (hereinafter t-butyl) group or other group having a quaternary carbon atom bonded to the ketone carbonyl function, e.g., $CH_3OCH_2C(CH_3)_2-$, $C_6H_5OC(CH_3)_2-$, 1-methylcyclohexyl, and is preferably t-butyl, i.e., $(CH_3)_3C-$; $R^5$ is phenyl, unsubstituted or substituted with one or more groups selected from alkyl, alkoxy, nitro, halo such as chloro, and carbonamido; E is a thermally removable leaving group as defined above and is preferably a phenoxy group, unsubstituted or substituted with one or more groups, for example, alkyl having 1 to 20 carbon atoms, alkoxy having 1 to 20 carbon atoms, and carboalkoxy having 1 to 20 carbon atoms; tM is a thermally migratable acyl group as defined above, preferably —$CO_2CH_2Ar$, —$CO_2R$, and —GOR where Ar represents a substituted or unsubstituted phenyl ring; R is alkyl or aralkyl having 1 to 12 carbon atoms; and $R^6$ and $R^7$ are selected from hydrogen and lower alkyl groups containing 1 to 6 carbon atoms, particularly ethyl.

The leuco dyes of the present invention are synthesized by the oxidative coupling of a color developer, e.g., a p-phenylenediamine substituted with a thermally migratable acyl group and color forming coupler substituted in the coupling position with a thermally removable leaving group as described, for example, in the copending U.S. patent application (Ser. No. 277,014) of Roger Boggs, et al. The oxidizing agent may be any oxidizing agent conventionally employed, e.g., potassium permanganate or potassium hexacyanoferrate(III) and is preferably potassium hexacyanoferrate(III).

The dye-forming couplers substituted in the coupling position with a leaving group may be prepared by an analogous procedure to that described in U.S. Pat, No. 3,929,484 to Robert Ross issued Dec. 30, 1975.

The dyes of this invention may be prepared by heating the leuco dyes of this invention under the appropriate conditions. Alternatively, the dyes may be made by N-acylating the corresponding azomethine dye. The N-acylation may be accomplished by any of the various methods known for acylation including reacting the dye with an acyl halide or acid anhydride under basic conditions. The azomethine dyes can be prepared by procedures known in the art, e.g., those described in the aforementioned James, T. H., *The Theory of the Photographic Process*, Fourth Ed., MacMillan Publishing Co., Inc., New York, 1977, pp. 337-362.

The following examples are given to further illustrate the present invention and are not intended to limit the scope thereof.

EXAMPLE 1

Preparation of
N-[4,4-dimethyl-2-[N-[4-diethylaminophenyl]-N-acetylamino]-3-oxo-2-phenoxypentanoyl]-2,4-dichloroaniline, hereinafter "Leuco Dye A", having the structural formula

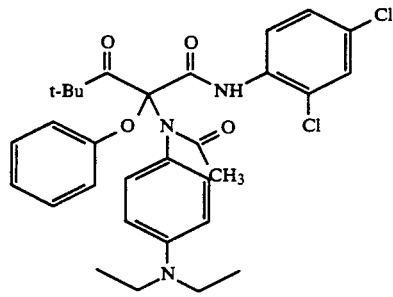

(1) Triethylamine (22.3 g, 30.6 mL, 0.22 mol) was added to a suspension of N,N-diethyl-p-phenylenediamine hydrochloride (20 g, 0.1 mol) in dichloromethane (150 mL) at room temperature. The mixture was cooled to 0° C. and acetyl chloride (7.85 g, 0.1 mol) was added dropwise, with stirring. The mixture was allowed to warm to room temperature, and the precipitate which had formed was removed by filtration. The solid residue was washed with dichloromethane, and the combined dichloromethane solutions were concentrated. The dark oil produced was triturated with hexanes (100 mL) to afford a light brown crystalline solid, which was purified by recrystallization from 50% aqueous ethanol to afford the N-acetyl-4-diethylaminoaniline (16.5 g, 80% yield) as a gray solid. The structure of this compound was confirmed by mass spectroscopy and by $^1H$ NMR spectroscopy.

(2) N-[4,4-dimethyl-3-oxo-2-phenoxypentanoyl]-2,4-dichloroaniline was prepared in three steps using a method analogous to that described in the aforementioned U.S. Pat. No. 3,929,484.

Step (i). Methyl 4,4-dimethyl-3-oxopentanoate (100 g, 0.632 mol) and 2,4-dichloroaniline (100 g, 0.617 mol) were heated at reflux for 6 hours in xylenes (reagent grade, dried over 4A molecular sieves, 150 mL) in a flask equipped with mechanical stirrer and distillation apparatus. 100 mL of distillate was collected during this period. The reaction mixture was then cooled to room temperature and petroleum ether (500 mL) was added with stirring. The mixture was cooled further with an ice bath, and the crystals which had formed were collected by filtration and washed with petroleum ether. A second crop was collected after concentration of the filtrate. The combined materials were dried under high vacuum to give N-[4,4,-dimethyl-3-oxopentanoyl]-2,4-dichloroaniline (152.8 g, 84% yield) as a white solid which melted at 77°-78° C. The structure of this compound was confirmed by mass spectroscopy and by $^1H$ and $^{13}C$ NMR spectroscopy.

Step (ii). Sulfuryl chloride (54.1 g, 0.4 mol) was added dropwise with vigorous stirring over a 60 minute period to a solution of N-[4,4-dimethyl-3-oxopentanoyl]-2,4-dichloroaniline, prepared as above (109 g, 0.378 mol) in dichloromethane (600 mL) at −10° C. The reaction mixture was maintained at this temperature for 3 hours after the addition had been completed. After this time, the mixture was allowed to warm to 0° C. and ice (approximately 50 mL) was added, with stirring. The organic layer was separated and washed with 50% saturated aqueous sodium chloride solution (2×500 mL), then dried over magnesium sulfate. Evaporation of the solvent afforded a brown oil which was stirred with ethanol (150 mL) to induce crystallization of the product. The resultant mixture was stored at 0° C. overnight. The solid product was removed by filtration, washed with cold ethanol and dried to afford N-[2-chloro-4,4,-dimethyl-3-oxopentanoyl]-2,4-dichloroaniline (104.2 g, 85.4% yield) as a white crystalline solid which melted at 64.5°-65.5° C. The structure of this compound was confirmed by mass spectroscopy and by $^1H$ and $^{13}C$ NMR spectroscopy.

Step (iii). Triethylamine (57.35 g, 566 mmol) was added to a stirred solution of N-[2-chloro-4,4,-dimethyl-3-oxopentanoyl]-2,4-dichloroaniline prepared as above (155.9 g, 483 mmol) and phenol (49.9 g, 530 mmol) in dry acetonitrile (1.3 L) under argon. After the addition had been completed, the mixture was heated at reflux for 7 hours. The reaction mixture was then cooled and the solvent was removed under reduced pressure. The residue was dissolved in methanol (300 mL) and allowed to stir at room temperature until crystallization began. After 2 hours, the mixture was cooled in an ice bath for a further 1 hour. The product was removed by filtration, washed with cold methanol, and dried to afford N-[4,4-dimethyl-3-oxo-2-phenoxypentanoyl]-2,4-dichloroaniline (99 g, 54% yield) as a white crystalline solid which melted at 112°-113.5° C. The structure of this compound was confirmed by mass spectroscopy and by $^1$H and $^{13}$C NMR spectroscopy.

(3) A 5% aqueous solution of sodium carbonate (89 mL) was added to a solution of N-[4,4-dimethyl-3-oxo-2-phenoxypentanoyl]-2,4-dichloroaniline (1.92 g, 5.05 mmol) and N-acetyl-4-diethylaminoaniline (1.07 g, 5.19 mmol) in ethyl acetate (35 mL). To the vigorously stirred mixture so formed was then added, in one portion, a solution of potassium hexacyanoferrate(III) (3.33 g, 10 mmol) in water (35 mL). The resultant mixture was stirred for 6 hours then allowed to stand for a further 18 hours. The ethyl acetate layer was then separated and the aqueous layer was washed with more ethyl acetate (2×10 mL). The combined organic layers were washed with a saturated sodium chloride solution and dried over sodium sulfate. After removal of the solvent, the crude product was purified by flash chromatography on silica gel with 1:1-1:0 dichloromethane/hexanes as eluant, followed by further flash chromatography on silica gel with 1:9 ethyl acetate/hexanes as eluant. Recrystallization from hexanes gave Leuco Dye A (253 mg, 9% yield) as a white solid which decomposed at 126°-128° C. The structure of this compound was confirmed by mass spectroscopy and by $^1$H and $^{13}$C NMR spectroscopy.

EXAMPLE 2

Preparation of N-[4,4-dimethyl-2-[N-[4-diethylaminophenyl]-N-[ethoxycarbonyl]amino]-3-oxo-2-phenoxypentanoyl]-2,4-dichloroaniline, hereinafter "Leuco Dye B", having the structural formula

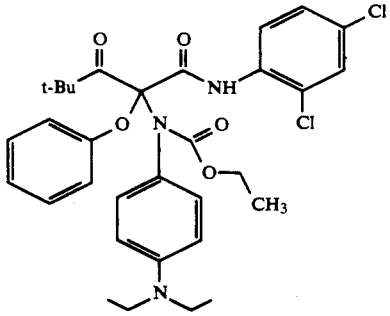

(1) Ethyl chloroformate 5.0 mL, 52 mmol) was added to a stirred mixture of N,N-diethyl-p-phenylenediamine hydrochloride (10 g, 50 mmol) and sodium hydrogen carbonate (23.0 g) in dichloromethane (120 mL) at room temperature under nitrogen. After four days at room temperature, the precipitate which had formed was removed by filtration through a pad of celite. The solid residue was washed with dichloromethane and the combined dichloromethane extracts were concentrated to produce a black oil, which was redissolved in dichloromethane (110 mL) and stirred with silica (100 cc) for 30 minutes. The silica was then removed by filtration through celite. The residue was washed with additional dichloromethane (3×30 mL) and the combined dichloromethane extracts were concentrated to give N-ethoxycarbonyl-4-diethylaminoaniline (8.55 g, 73% yield) as a pale gray solid which melted at 31°-33° C. The structure of this compound was confirmed by mass spectroscopy and by $^1$H and $^{13}$C NMR spectroscopy.

(2) A 5% aqueous solution of sodium carbonate (89 mL) was added to a solution of N-[4,4-dimethyl-3-oxo-2-phenoxypentanoyl]-2,4-dichloroaniline, prepared in Example 1 above, (1.9 g, 5 mmol) and N-ethoxycarbonyl-4-diethylaminoaniline (1.73 g of 70% pure material, 5.12 mmol) in ethyl acetate (35 mL). To the vigorously stirred mixture so formed was then added, in one portion, a solution of potassium hexacyanoferrate(III) (3.5 g, 10.6 mmol) in water (35 mL). The resultant mixture was stirred for 4 hours, after which the ethyl acetate layer was separated and the aqueous layer was washed with additional ethyl acetate. The combined organic layers were washed with a saturated sodium chloride solution and dried over sodium sulfate. After removal of the solvent, the crude product was purified by repeated flash chromatography on silica gel with 1:10 ethyl acetate/hexanes as eluant to give Leuco Dye B (1.0 g, 33% yield) as a white foam. The structure of this compound was confirmed by mass spectroscopy and by $^1$H and $^{13}$C NMR spectroscopy.

EXAMPLE 3

Preparation of N-[4,4-dimethyl-2-[N-[4-diethyl-aminophenyl]-N-[benzyloxycarbonyl]-amino]-3-oxo-2-phenoxypentanoyl]-2,4-dichloroaniline, hereinafter "Leuco Dye C", having the structural formula

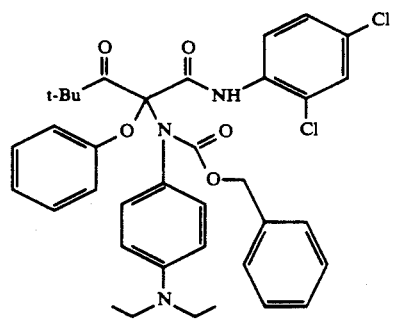

(1) Benzyl chloroformate (15.7 mL, 0.11 mol) was added dropwise to a stirred mixture of N,N-diethyl-p-phenylenediamine hydrochloride (20 g, 0.1 mol) and sodium hydrogen carbonate (42.0 g) in dichloromethane at room temperature under nitrogen. After 16 hours at room temperature, the precipitate which had formed was removed by filtration. The solid residue was washed with dichloromethane and the combined dichloromethane extracts were concentrated to produce a brown oil. This material was purified by preparative high pressure liquid chromatography (hereinafter HPLC) on silica gel eluting with 10% hexanes/dichloromethane followed by dichloromethane alone. The resultant oil was triturated with hexanes to give N-benzyloxycarbonyl-4-diethylaminoaniline (18.25 g, 61% yield) as a crystalline solid. The structure of this compound was confirmed by mass spectroscopy and by $^1$H NMR spectroscopy.

(2) A 5% aqueous solution of sodium carbonate (300 mL) was added to a solution of N-[4,4-dimethyl-3-oxo-2-phenoxypentanoyl]-2,4-dichloroaniline, prepared as in Example 1 above, (5.00 g, 13.15 mmol) and N-benzyloxycarbonyl-4-diethylaminoaniline (3.923 g, 13.15 mmol) in ethyl acetate (100 mL). To the vigorously stirred mixture so formed was then added, in one portion, a solution of potassium hexacyanoferrate(III) (9.1 g, 27.6 mmol) in water (100 mL). The resultant mixture was stirred for 1.5 hours, after which the ethyl acetate layer was separated and the aqueous layer was washed with more ethyl acetate (50 mL). The combined organic layers were washed with a 50% saturated sodium chloride solution and dried over sodium sulfate. After removal of the solvent, the crude product was purified by HPLC on silica gel with 1:1 dichloromethane/hexanes as eluant. Recrystallization from hexanes gave Leuco Dye C (2.2 g, 25% yield). The structure of this compound was confirmed by mass spectroscopy and by $^1$H and $^{13}$C NMR spectroscopy.

EXAMPLE 4

Preparation of N-[2-[4-carbomethoxyphenoxy]-4,4-dimethyl-2-[N-[4-diethylaminophenyl]-N-acetylamino]-3-oxopentanoyl]-2,4-dichloroaniline, hereinafter "Leuco Dye D", having the structural formula

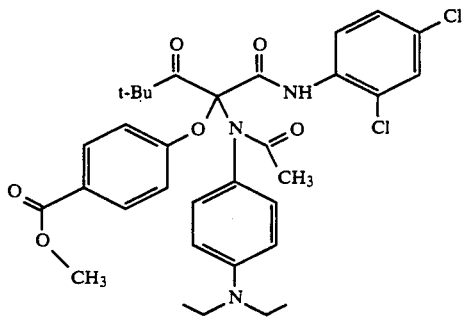

(1) HCl gas was bubbled into a suspension of N-[2-[4-carboxyphenoxy]-4,4-dimethyl-3-oxopentanoyl]-2,4-dichloroaniline (12.0 g, 28.3 mmol, available from Eastman Kodak, Rochester, N.Y.) in absolute methanol (175 mL) for 30 minutes. The mixture was heated to reflux for 2 hrs during which complete solution was obtained. Upon cooling to room temperature, white crystals of the product began to form. The reaction mixture was cooled in an ice bath, and the solids were collected by filtration, washed with fresh methanol and air-dried to provide N-[2-[4-carbomethoxyphenoxy]-4,4-dimethyl-3-oxopentanoyl]-2,4-dichloroaniline (8.4 g, 68% yield). The structure of this compound was confirmed by mass spectroscopy and by $^1$H and $^{13}$C NMR spectroscopy.

(2) A 5% aqueous solution of sodium carbonate (200 mL) was added to a solution of N-[2-[4-carbomethoxyphenoxy]-4,4-dimethyl-3-oxopentanoyl]-2, 4-dichloroaniline (2.192 g, 5.0 mmol) and N-acetyl-4-diethylaminoaniline, prepared as in Example 1 above, (1.032g, 5.0 mmol) in ethyl acetate (50 mL). To the mixture so formed was then added in one portion, with vigorous stirring, a solution of potassium hexacyanoferrate(III) (3.457 g, 10 mmol) in water (50 mL). The resultant mixture was stirred for one hour, after which the ethyl acetate layer was separated, washed with a 50% saturated sodium chloride solution and dried over sodium sulfate. After removal of the solvent, the crude product was purified by silica gel chromatography followed by recrystallization from hexanes to yield Leuco Dye D (550 mg, 17% yield). The structure of this compound was confirmed by mass spectroscopy and by $^1$H NMR spectroscopy.

EXAMPLE 5

Preparation of N-acetyl—N-[4,4-dimethyl-2-[4-diethylaminophenyl]-imino-3-oxopentanoyl]-2,4-dichloroaniline, hereinafter "Dye A", having the structural formula

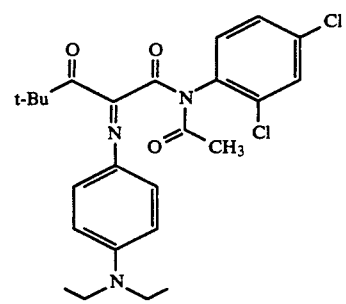

(1) N-[4,4-dimethyl-2-[4-diethylaminophenyl]imino-3-oxopentanoyl]-2,4-dichloroaniline was prepared using a method analogous to that described in J. Korinek, J. Poskocil and J. Arient, Collection Czechoslov. Chem. Commun., 1979, 44, 1460. A solution of N-[2-[4-carboxyphenoxy]-4,4-dimethyl-3-oxopentanoyl]-2,4-dichloroaniline (10.0 g, 23.6 mmol, available from Eastman Kodak, Rochester, N.Y.) in a mixture of 1M aqueous sodium hydroxide solution (100 mL) and ethanol (50 mL), together with a solution of N,N-diethyl-p-phenylenediamine hydrochloride (5.20 g, 26 mmol) in ethanol (50 mL), was mixed all at once with a solution of potassium persulfate (7.0 g, 26 mmol) in water (250 mL) containing ethanol (50 mL). The yellow reaction mixture was stirred for one hour, and then extracted with dichloromethane (200 mL). The organic layer was separated and washed with a 50% saturated aqueous sodium chloride solution (200 mL) and dried over sodium sulfate. Evaporation of the solvent gave 11.4 g of crude material, which was taken up in dichloromethane (200 mL) and slurried with silica gel (40 g). After filtering, the solvent was removed to afford an oil (12 g) which was crystallized from hexanes (80 mL) to yield N-[4,4-dimethyl-2-[4-diethylaminophenyl]imino-3-oxopentanoyl]-2,4-dichloroaniline as an orange solid (7.1 g, 68% yield). The compound exhibited a maximum absorption in the visible region of the electromagnetic spectrum at 440 nm, $\epsilon=20,600$. The structure of this compound was further confirmed by mass spectroscopy and by $^1$H and $^{13}$C NMR spectroscopy.

(2) Acetic anhydride (0.13 mL, 138 mmol) was added to a solution of N-[4,4-dimethyl-2-[4-diethylaminophenyl]imino-3-oxopentanoyl]-2,4-dichloroaniline (445 mg, 1 mmol) and 4-dimethylaminopyridine (DMAP, 123 mg, 1.0 mmol) in dichloromethane (5 mL) at room temperature and the resultant solution was allowed to stand for 3 days. The solvent was then removed, and the crude product was purified by repeated flash chromatography on silica gel with 3% ethyl acetate/hexanes as eluant to give Dye A (243 mg, 50% yield) as an orange foam. The dye had a principal absorption in the visible region of the electromagnetic spectrum at 438 nm, $\epsilon=15,300$. The structure of this compound Was confirmed by mass spectroscopy and by $^1$H $^{13}$C NMR spectroscopy.

EXAMPLE 6

Preparation of N-ethoxycarbonyl-N-[4,4-dimethyl-2-[4-diethylaminophenyl]imino-3-oxopentanoyl]-2,4-dichloroaniline, hereinafter "Dye B", having the structural formula

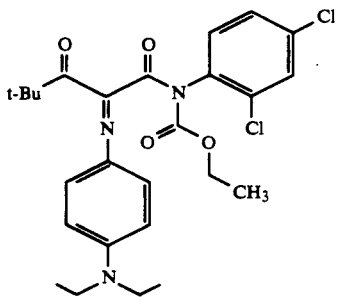

Ethyl chloroformate (0.15 mL, 1.57 mmol) was added to a solution of N-[4,4-dimethyl-2-[4-diethylaminophenyl]-imino-3-oxopentanoyl]-2,4-dichloroaniline, prepared as in Example 5 above (440 mg, 0.98 mmol), triethylamine (0.15 mL, 1.08 mmol) and DMAP (123 mg, 1 mmol) in dry dichloromethane (5 mL) and the resultant solution was stirred for 11 days under nitrogen. The solvent was then removed, and the crude product was purified by flash chromatography on silica gel with 3% ethyl acetate/hexanes as eluant to give slightly impure Dye B (530 mg). Further purification was effected by a second chromatographic separation on silica gel using the same eluant as before. The resultant Dye B, a red oil, had a principal absorption in the visible region of the electromagnetic spectrum at 438 nm, $\epsilon = 17,000$. The structure of this compound was confirmed by mass spectroscopy and by 1H and $^{13}$C NMR spectroscopy.

EXAMPLE 7

Preparation of N-benzyloxycarbonyl-N-[4,4-dimethyl-2-[4-diethylaminophenyl]imino-3-oxopentanoyl]-2,4-dichloroaniline, hereinafter "Dye C", having the structural formula

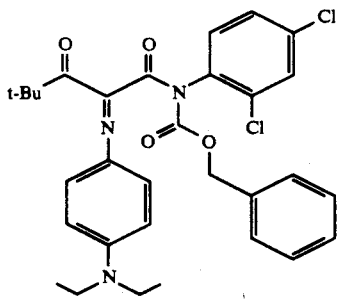

Benzyl chloroformate (0.16 mL, 1.12 mmol) was added to a solution of N-[4,4-dimethyl-2-[4-diethylaminophenyl]imino-3-oxopentanoyl]-2,4-dichloroaniline, prepared as in Example 5 above (478 mg, 1.07 mmol), triethylamine (0.15 mL, 1.08 mmol) and DMAP (135 mg, 1.1 mmol) in dry dichloromethane (5 mL) and the resultant solution was stirred for 3 hours under nitrogen. Additional benzyl chloroformate (0.2 mL, 1.4 mmol) was then added, followed one hour later by more benzyl chloroformate (0.2 mL, 1.4 mmol) and additional triethylamine (0.15 mL, 1.08 mmol). The resultant solution was stirred under nitrogen for 7 days, after which the solvent was removed. The crude product was purified by flash chromatography on silica gel with 3% ethyl acetate/hexanes as eluant to give slightly impure Dye C. Further purification was effected by a second chromatographic separation on silica gel in the same manner as above. Dye C (240 mg, 39% yield) was obtained as an orange foam which had a principal absorption in the visible region of the electromagnetic spectrum at 438 nm, $\epsilon = 15,900$. The structure of this compound was confirmed by mass spectroscopy and by 1H and $^{13}$C NMR spectroscopy.

EXAMPLE 8

As proof that the synthetic Dyes A, B and C of Examples 5, 6 and 7, respectively, are identical to the products of the laser-induced heating of Leuco Dyes A, B and C of Examples 1, 2 and 3, carried out in experiment 10 below, the following HPLC analysis was conducted.

Dichloromethane extracts of films A, B and C (containing Leuco Dyes A, B and C, prepared as described in Example 10 below), which had been exposed as described in Example 10 at a scan speed of 0.4 m/s to give the densities shown in Table 2, were analyzed by HPLC using a Hewlett-Packard 1090M Liquid Chromatograph with diode array detector. The column employed was a reversed-phase Type AQ-303, having 5 micron particle size and 120 Å pore size, available from YMC Inc., 51 Gibraltar Drive, Morris Plains, N.J. It was eluted with acetonitrile/water mixtures, in such a way that each component of the extracted film was well resolved as a single peak. A single yellow product was observed for each extracted film. The retention times and UV/VIS spectra of the yellow products from films A, B and C were compared with those of samples of the corresponding Dyes A, B and C prepared as described in Examples 5, 6 and 7. In each case they were found to be identical within the limits of experimental error.

EXAMPLE 9

In order to determine conclusively that acyl migration had occurred to the nitrogen atom of the amide functional group in Leuco Dyes A, B and C of Examples 1, 2 and 3, definitive confirmation of the structures of Dyes A, B and C was obtained by comparison of their respective $^{13}$C NMR chemical shifts with those of an analogous Dye whose structure was conclusively determined by crystal x-ray analysis.

The X-ray crystallographic analysis was performed on Dye X, N-tert-butoxycarbonyl-N-[4,4-dimethyl-2-[4-diethylaminophenyl]imino-3-oxopentanoyl]-2,4-dichloroaniline, having the structural formula shown below:

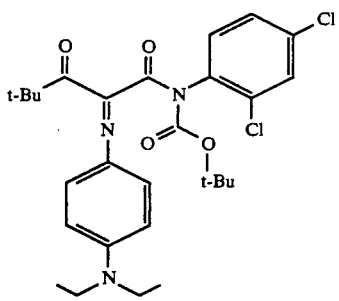

Dye X was prepared in a manner similar to that employed in the synthesis of Dyes A, B and C (Examples 5, 6 and 7) as follows:

A solution of di-tert-butyl dicarbonate (240 mg, 1.1 mmol) in dichloromethane (5 mL) was added to a solution of N-[4,4-dimethyl-2-[4-diethylaminophenyl]imino-3-oxopentanoyl]-2,4-dichloroaniline (448.4 mg, 1.0 mmol, prepared as described in Example 5 above) and N, N-dimethylaminopyridine (134.4 mg, 1.1 mmol) in dichloromethane (5 mL). The mixture was stirred overnight, after which work-up afforded Dye X as a yellow solid which could be crystallized from methanol. The structure of this compound was confirmed by mass spectroscopy and by $^1$H and $^{13}$C NMR spectroscopy.

Single crystal X-ray analysis was performed on a crystal of Dye X grown from methanol. A light yellow needle of approximate dimensions 0.08×0.13×0.50 mm was selected for data collection on a Nicolet P1-bar diffractometer with graphite monochromatized MoKα radiation. Cell dimensions were determined from 12 reflections in the interval $17° < 2\theta < 22°$. Intensities of 1493 reflections were collected using the ω scan mode with variable scan speeds between 2.93-6.51 degrees/min. Four standard reflections were measured every 100 reflections with no significant loss of intensity. The structure was solved by direct methods with SHELX86 and refined by full-matrix least squares with anisotropic displacement parameters for Cl atoms, isotropic displacement parameters for C, O, N and fixed H atoms (R =0.102, Rw=0.092). The maximum height in the final difference map was $0.50 e^-/Å^3$.

Cell parameters and non-hydrogen atom fractional crystal coordinates for Dye X are shown in Table 1 below.

TABLE 1

| Crystal system: monoclinic | Space group: C2/c |
|---|---|
| a = 33.217(17)Å | β = 100.16(5)° |
| b = 6.419(3)Å | V = 5896(10)Å³ |
| c = 28.094(14)Å | ρcalc = 1.236 g/cm³ |

| Atom | x | y | z |
|---|---|---|---|
| Cl1 | 0.594389 | −0.426502 | 0.946245 |
| Cl2 | 0.460397 | −0.845253 | 0.957516 |
| O1 | 0.664952 | −0.349627 | 0.869088 |
| O2 | 0.584603 | −0.605529 | 0.815594 |
| O3 | 0.641386 | −0.893272 | 0.953575 |
| O4 | 0.684307 | −0.799986 | 0.904381 |
| N1 | 0.664875 | −0.723292 | 0.781875 |
| N2 | 0.582867 | −1.354591 | 0.667544 |
| N3 | 0.615062 | −0.761964 | 0.882627 |
| C1 | 0.723526 | −0.408926 | 0.831967 |
| C2 | 0.720803 | −0.334767 | 0.77915 |
| C3 | 0.748749 | −0.603423 | 0.840285 |
| C4 | 0.743176 | −0.239659 | 0.866488 |
| C5 | 0.680327 | −0.455419 | 0.84147 |
| C6 | 0.655865 | −0.632265 | 0.818652 |
| C7 | 0.643272 | −0.885957 | 0.757534 |
| C8 | 0.646375 | −0.906201 | 0.707687 |

TABLE 1-continued

| C9 | 0.627441 | −1.056391 | 0.679265 |
|---|---|---|---|
| C10 | 0.602617 | −1.202442 | 0.695411 |
| C11 | 0.600162 | −1.200644 | 0.745321 |
| C12 | 0.619263 | −1.040014 | 0.773586 |
| C13 | 0.561141 | −1.530194 | 0.686392 |
| C14 | 0.519093 | −1.468329 | 0.686471 |
| C15 | 0.585257 | −1.370713 | 0.614927 |
| C16 | 0.620586 | −1.488475 | 0.606856 |
| C17 | 0.616261 | −0.663534 | 0.838942 |
| C18 | 0.650219 | −0.823448 | 0.912817 |
| C19 | 0.673023 | −0.934957 | 0.996559 |
| C20 | 0.700945 | −1.098221 | 0.984044 |
| C21 | 0.694797 | −0.739636 | 1.012443 |
| C22 | 0.648028 | −1.011912 | 1.034476 |
| C23 | 0.574795 | −0.790952 | 0.897252 |
| C24 | 0.552982 | −0.965122 | 0.880629 |
| C25 | 0.515632 | −0.964017 | 0.903333 |
| C26 | 0.505503 | −0.815532 | 0.933338 |
| C27 | 0.528344 | −0.644468 | 0.947779 |
| C28 | 0.563836 | −0.644293 | 0.926047 |

The structural analogy between Dyes A, B and C and Dye X was confirmed by $^{13}$C NMR spectroscopy. Spectra were measured at 75 MHz in deuterochloroform solution. The chemical shifts of the amide carbonyl carbon atoms of the four dyes were, respectively, 171.4, 169 3, 169.2 and 169.1 ppm. The difference in chemical shift for Dye A is due to the difference of the migrating group as compared to the migrating group in the other three dyes. The full $^{13}$C NMR spectra for the dyes are listed below with chemical shifts in ppm:

Dye A: 205.3, 171.4, 169.1, 150.1, 148.0, 136.2, 134.0, 131.9, 130.3, 129.0, 125.6, 123.2, 122.4, 111.6, 44.6, 44.4, 27.2, 24.3, 12.6 ppm.

Dye B: 205 3, 169.3, 152.5, 149.5, 148.3, 135.2, 133.5, 132.9, 131.6, 129.7, 128.2, 126.1, 123.6, 111.5, 63.9, 44.6, 44.4, 27.5, 14.1, 12.6 ppm.

Dye C: 205.2, 169.2, 152.6, 149.4, 148.3, 135.3, 134.5, 133.6, 132.7, 131.5, 129.7, 128.5, 128.3, 127.8, 126.0, 123.2, 111.5, 69.1, 44.6, 44.4, 29.7, 27.4, 12.6 ppm.

Dye X: 205.3, 169.1, 151.3, 150.0, 148.1, 134.8, 133.8, 133.4, 133.2, 131.5, 129.6, 128.1, 125.9, 111.5, 84.7, 44.6, 44.4, 27.6, 27.5, 12.6 ppm.

In producing images according to the present invention, the way in which the heat is applied or induced imagewise may be realized in a variety of ways, for example, by direct application of heat using a thermal printing head or thermal recording pen or by conduction from heated image-markings of an original using conventional thermographic copying techniques. Preferably, selective heating is produced in the image-forming layers by the conversion of electromagnetic radiation into heat and preferably, the light source is a laser emitting source such as a gas laser or a semiconductor laser diode. The use of a laser source is not only well suited for recording in a scanning mode but by utilizing a highly concentrated light source, photoenergy can be concentrated in a small area so that it is possible to record at high speed and high resolution. Also, it is a convenient way to record data as a heat pattern in response to transmitted signals such as digitized information and a convenient way of preparing multicolor images by employing a plurality of laser sources that emit light of different wavelengths.

In the latter embodiment an infrared absorbing substance is employed for converting infrared radiation into heat which is transferred to the heat-sensitive leuco dye to initiate the departure of the thermally removable leaving group and the migration of the thermally migratable acyl group to form the dye chromophore. Obviously, the infrared absorber should be in a heat-conductive relationship with the heat-sensitive compound, for example, in the same layer as the heat-sensitive compound or in an adjacent layer. Although an inorganic compound may be employed, the infrared absorber preferably is an organic compound, such as a cyanine, merocyanine, squarylium or thiopyrylium dye. Preferably the infrared absorber is substantially non-absorbing in the visible region of the electromagnetic spectrum so that it will not add any substantial amount of color to the Dmin areas, i.e., the highlight areas of the image.

In the production of multicolor images, infrared absorbers are preferably selected that absorb radiation at different predetermined wavelengths above 700 nm. Each imaging layer can then be exposed independently of the others by using an appropriate infrared absorber. As an illustration, the layers of heat-sensitive compound for forming yellow, magenta, and cyan may have infrared absorbers associated therewith that absorb radiation at 780 nm, 850 nm and 900 nm, respectively, and may be addressed by laser sources, for example, infrared laser diodes emitting light at these respective wavelengths so that the three color-forming layers can be exposed independently of one another. While each layer may be exposed in a separate scan, it is usually preferred to expose all of the imaging layers simultaneously in a single scan using multiple laser sources of the appropriate wavelengths. Rather than using superimposed imaging layers, the heat-sensitive leuco dyes and associated infrared absorbers may be arranged in an array of side-by-side dots or stripes in a single recording layer.

In a further embodiment, multicolor images may be produced using the same infrared absorbing compound in association with each of two or more superimposed imaging layers and exposing each imaging layer by controlling the depth of focussing of the laser source. In this embodiment, the concentration of infrared absorber is adjusted so that each of the infrared absorbing layers absorb approximately the same amount of laser energy. It will be appreciated that controlling the focussing depth to address each layer separately may be carried out in combination with the previous embodiment of using infrared absorbers that selectively absorb at different wavelengths in which instance the concentration of infrared absorber would have to be adjusted for the laser energy since the first infrared dye would not absorb any substantial amount of radiation at the absorption peaks of the second and third dyes and so forth.

Where imagewise heating is induced by converting light to heat as in the embodiments described above, the heat-sensitive element may be heated prior to, during or subsequent to imagewise heating. This may be achieved using a platen or heated drum or by employing an additional laser source for heating the element while it is being exposed imagewise.

The heat-sensitive elements of the present invention comprise a support carrying at least one imaging layer of the heat-sensitive leuco dyes of this invention, and may contain additional layers, for example, a subbing layer to improve adhesion to the support, interlayers for thermally isolating the imaging layers from each other, infrared absorbing layers as discussed above, anti-static layers, and anti-abrasive topcoat layer, and an ultraviolet screening layer having an ultraviolet absorber therein or other auxiliary layers. For example, an electroconductive layer may be included and imagewise color formation effected by heat energy generated in response to an electrical signal.

Heat-sensitive leuco dyes of this invention are selected which will generate dyes possessing the desired colors or combination of colors and this includes ultraviolet and infrared absorbing dyes. For multicolor images, the leuco dyes selected may comprise the additive primary colors red, green, and blue, the subtractive primaries yellow, magenta, and cyan or other combinations of colors, which combinations may additionally include black. As noted previously, the leuco dyes are generally selected to give the subtractive colors cyan, magenta, and yellow commonly employed in photographic processes to provide full natural color. Also, a leuco dye that forms a black dye can be selected for providing a black image or a leuco dye that forms an infrared dye can be selected for forming an image readable, for example, by an IR optical character reader.

The support employed may be transparent or opaque and may be any material that retains its dimensional stability at the temperature used for image formation. Suitable supports include paper, paper coated with a resin or pigment, such as calcium carbonate or calcined clay, synthetic papers or plastic films, such as polyethylene, polypropylene, polycarbonate, cellulose acetate, polyethylene terephthalate and polystyrene.

Usually the layer of heat-sensitive leuco dye contains a binder and is formed by combining the heat-sensitive leuco dye and a binder in a common solvent, applying a layer of the coating composition to the support, and then drying. Rather than a solution coating, the layer may be applied as a dispersion or an emulsion. The coating composition also may contain dispersing agents, plasticisers, defoaming agents, coating aids and materials such as waxes to prevent sticking where thermal pens are used to apply the imagewise pattern of heat. In forming the layer(s) containing the heat-sensitive leuco dyes and the interlayers or other layers, temperatures should be maintained below levels that will initiate the removal of the leaving group and migration of the tM group so that the heat-sensitive leuco dyes will not be prematurely colored.

Any of the binders commonly employed in heat-sensitive recording elements may be employed provided that the binder selected is inert, i.e., does not have any adverse effect on the heat-sensitive leuco dye incorporated therein. Also, the binder should be heat-stable at the temperatures encountered during image formation and it should be transparent so that it does not interfere with viewing of the color image. Where electromagnetic radiation is employed to induce imagewise heating, the binder should also transmit the light intended to initiate image formation. Examples of binders that may be used include polyvinyl alcohol, polyvinyl pyrrolidone, methyl cellulose, cellulose acetate butyrate, copolymers of styrene and butadiene, copolymers of methyl and ethyl acrylate, polyvinyl acetate, polymethyl methacrylate, polyvinyl chloride, poly(ethyloxazoline), polyvinyl butyral and polycarbonate.

EXAMPLE 10

As an illustration of the utility of the compounds of this invention, coatings A, B and C were made using the aforementioned Leuco Dyes A, B and C of Examples 1, 2 and 3 in the following manner:

A solution of the leuco dye (40 mg) in dichloromethane (0.17 mL) was combined with an infrared absorbing dye, (1,3-bis[2,6-di-t-butyl-4H-thiopyran-4-ylidenemethyl]-2,4-dihydroxy-dihydroxide-cyclobutene diylium bis-inner salt (see U.S. Pat. No. 4,508,811), 0.13 mL of a 1% solution in dichloromethane and a polymeric binder, polyvinyl butyral (Butvar B-79, supplied by Monsanto, St. Louis, Mo.) 0.4 mL of a 10% solution in dichloromethane. The resultant solution was coated onto a transparent polyethylene terephthalate base of 4 mil thickness (commercially available from ICI Americas, Inc., Wilmington, Del.) using a #8 coating rod. The film so formed was laminated to a second sheet of polyethylene terephthalate of 1.4 mil thickness (ICI type 3121, supplied by ICI Americas, Inc., Wilmington, Del.) at 180° F. and 60 psi.

The above prepared coatings A, B, and C were exposed to infrared radiation from a GaAlAs semiconductor diode laser emitting at 819 nm, which delivered 127 mW to the medium. The laser output was focussed to a spot of about 33×3 microns in size. The coatings were wrapped around a drum whose axis was perpendicular to the incident light. The 4 mil base of the laminated structure was in contact with the drum, so that exposure of the infrared absorbing layer occurred through the 1.4 mil base. Rotation of the drum about its axis and simultaneous translation in the direction of the axis caused the laser spot to write a helical pattern on the medium. The pitch of the helix was 33 microns, chosen so that none of the medium was left unexposed between adjacent turns. In this arrangement, the exposure received by the medium was inversely proportional to the speed of rotation of the drum (here measured as a linear speed at the medium surface).

The transmission optical density (hereinafter ODtrans) measured in blue light for each of the coatings is set forth in Table 2 as a function of drum speed. It should be noted that the initial transmission optical density (hereinafter Dmih) measured in blue light before exposure for coatings A, B and C was measured and was 0.05. Density measurements were obtained using a Macbeth TD-504 densitometer, using the appropriate filter. Each figure is the mean of 10 readings, 5 taken in different parts of each of two coatings prepared from the same coating fluid. A comparison coating X was made in the same manner as above, except that the leuco dye employed was a prior art, heat-sensitive leuco dye substituted with a t-Boc protecting group to stabilize the colorless form. The leuco dye, hereinafter Leuco Dye X, has the structural formula

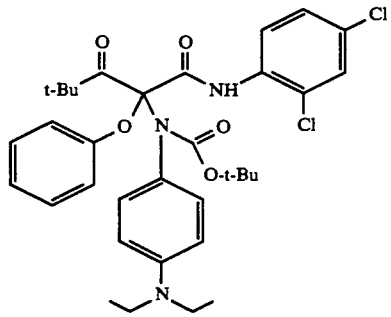

and is disclosed and claimed in the aforementioned copending patent application of Roger Boggs, et al, Ser. No. 07/277,014, now abandoned and replaced by copending U.S. patent application Ser. Nos. 07/729,420 (now U.S. Pat. No. 5,192,645) and 07/729,426, both filed on Jul. 12, 1991). The ODtrans measured for coating X is also set forth in Table 2 as is the degree of bubble formation in imaged areas for each of the four coatings.

The degree of bubble formation is designated High (H), Medium (M) or Low (L) according the following definitions:

"High"—bubbles of at least 1 mm diameter;
"Medium"—smaller bubbles which lead to scattering of light and consequently to areas of the film which appear dark in transmitted light;
"Low"—image quality is not compromised by bubbles.

It will be appreciated that where bubble formation is High, the Dmax values reported in Table 2 are approximate due to the scattering of light by bubbles.

TABLE 2

| Drum speed (m/s) | Coating: A | B | C | X |
|---|---|---|---|---|
| | ODtrans (Bubble formation) | | | |
| 0.3 | 1.23(L) | 1.27(L) | 1.20(L) | 1.49(H) |
| 0.4 | 1.44(L) | 1.54(L) | 1.36(L) | 1.43(H) |
| 0.5 | 1.38(L) | 1.32(L) | 1.30(L) | 1.37(M) |
| 0.6 | 1.30(L) | 1.24(L) | 1.12(L) | 1.29(L) |
| 0.75 | 0.95(L) | 0.82(L) | 0.90(L) | 0.82(L) |
| 1.0 | 0.39(L) | 0.30(L) | 0.52(L) | 0.38(L) |

From the ODtrans values reported in Table 2, it can be seen that color is formed at the various scanning rates for each of the sample coatings comprising a leuco dye of the present invention clearly demonstrating the utility of the leuco dyes as thermal imaging materials. Table 2 also reveals that the images generated with the leuco dyes of this invention are not compromised by bubble formation regardless of the exposure, whereas the image generated by the coating containing the prior art leuco dye is compromised by bubble formation at higher exposures. Since the conversion of the leuco dye of this invention into colored dyes does not involve fragmentation of a thermally removable group, imaging systems employing these leuco dyes have the significant advantage of decreased bubble formation relative to imaging systems which utilize prior art leuco dyes substituted with thermally removable groups which fragment upon heating to generate gases.

It will be appreciated that the leuco dyes of the present invention and the heat-sensitive elements prepared therefrom may be used in various thermal recording systems including thermal printing, thermographic copying and, particularly, high resolution images suitable for viewable color prints and transparencies, color images requiring magnification such as microfilm, color filters for color displays and color sensors, optical disks and so forth. Depending upon the particular application, the heat-sensitive elements may contain thermal isolating layers, reflective, subcoat, topcoat or other layers, and the various layers including the imaging layer(s) together with any infrared absorbing layer(s) may be arranged in the configuration as appropriate.

Since certain changes may be made in the herein described subject matter without departing from the scope of the invention herein involved, it is intended that all matter contained in the above description and examples be interpreted as illustrative and not in a limiting sense.

We claim:
1. A heat-sensitive recording element which comprises a support carrying at least one layer of a leuco dye represented by

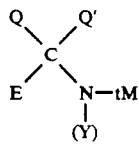

wherein:
E represents a thermally removable leaving group;
tM represents a thermally migratable acyl group;
Q, Q' and C taken together represent a dye-forming coupler moiety wherein C is the coupling carbon of said coupler moiety; and,
(Y) taken together with N represents an aromatic amino color developer moiety,
one of said Q, Q' and (Y) containing an atom selected from the atoms comprising Group 5A/Group 6A of the Periodic Table, said groups E and tM maintaining said leuco dye in a substantially colorless form until the application of heat causes said group E to be eliminated from said leuco dye and said group tM to migrate from said N atom to said Group 5A/Group 6A atom thereby forming a dye represented by

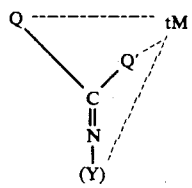

wherein said dotted lines indicate that said tM group is bonded to said Group 5A/Group 6A atom in one of said Q, Q' and (Y).

2. A heat-sensitive recording element as defined in claim 1 wherein said Group 5A/Group 6A atom to which said tM migrates is selected from a nitrogen atom, oxygen atom and sulfur atom.

3. A heat-sensitive recording element as defined in claim 1 wherein said Group 5A/Group 6A atom to which said tM migrates is a nitrogen atom.

4. A heat-sensitive recording element as defined in claim 1 wherein said coupler moiety is a yellow dye-forming coupler moiety having the structural formula

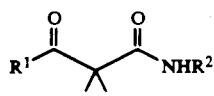

wherein $R^1$ is selected from $(CH_3)_3C-$, $CH_3OCH_2(CH_3)_2C-$, $C_6H_5O(CH_3)_2C-$ and phenyl, unsubstituted or substituted with one or more groups selected from alkyl, alkoxy, nitro, halo, and carbonamido; $R^2$ is phenyl, unsubstituted or substituted with one or more groups selected from alkyl, alkoxy, nitro, halo, and carbonamido, said phenyl group $R^2$ being the same or different from said phenyl group $R^1$.

5. A heat-sensitive recording element as defined in claim 1 wherein said aromatic amino color developer is a p-phenylenediamine.

6. A heat-sensitive recording element as defined in claim 1 wherein said aromatic amino color developer is represented by

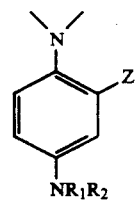

wherein Z represents an organic side chain containing a Group 5A/Group 6A atom to which said tM can migrate and $R_1$ and $R_2$, the same or different, are each selected from hydrogen and lower alkyl groups containing 1 to 6 carbon atoms.

7. A heat-sensitive recording element as defined in claim 1 wherein said tM is represented by the structural formula

wherein R is selected from alkyl, cycloalkyl, aryl, aralkyl, alkaryl, heterocyclic and,

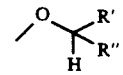

wherein R' and R", the same or different, are selected from hydrogen, alkyl, cycloalkyl, aryl, aralkyl, alkaryl and heterocyclic.

8. A heat-sensitive recording element as defined in claim I wherein said E is a phenoxy group, unsubstituted or substituted with one or more groups selected from alkyl, alkoxy, halo, carboxy, nitro, cyano, —SO$_2$alkyl, —SO$_2$phenyl, tosyl and N,N-(dialkyl)amino.

9. A heat-sensitive recording element as defined in claim 1 which comprises at least two layers, each layer containing a leuco dye and additionally containing a thermal isolating layer between adjacent layers of leuco dye.

10. A heat-sensitive recording element as defined in claim 9 wherein an infrared absorber is associated with each said layer of leuco dye.

11. A heat-sensitive recording element which comprises a support carrying at least one layer of a leuco dye having the structural formula

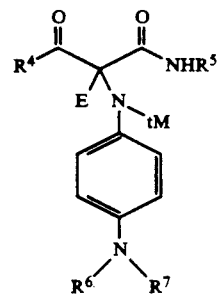

wherein $R^4$ is a t-butyl group or other group having a quaternary carbon atom bonded to the ketone carbonyl function; $R^5$ is phenyl, unsubstituted or substituted with one or more groups selected from alkyl, alkoxy, nitro, halo, and carbonamido; E is a thermally removable leaving group; tM is a thermally migratable acyl group; and $R^6$ and $R^7$ are selected from hydrogen and lower alkyl groups containing 1 to 6 carbon atoms, said thermally migratable acyl group and said thermally removable leaving group maintaining said leuco dye in its colorless form until the application of heat causes the elimination of the thermally removable leaving group and the migration of the thermally migratable acyl group to the N containing H and $R^5$ whereby said leuco dye is converted into an image dye represented by the structural formula

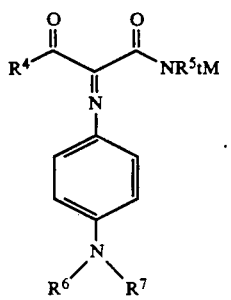

12. A heat-sensitive recording element as defined in claim 11 wherein $R^4$ is a t-butyl group.

13. A heat-sensitive recording element as defined in claim 11 wherein $R^6$ and $R^7$ are each ethyl.

14. A heat-sensitive recording element as defined in claim 11 wherein E is a substituted or unsubstituted phenoxy group.

15. A heat-sensitive recording element as defined in claim 11 wherein said $R^5$ is a 2,4-dichlorophenyl group.

16. A heat-sensitive recording element as defined in claim 11 wherein said leuco dye has the structural formula

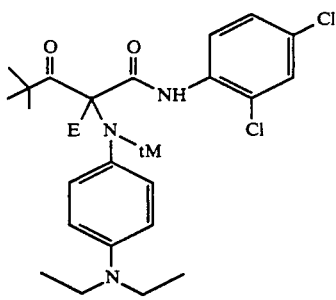

which is converted into the image dye having the formula

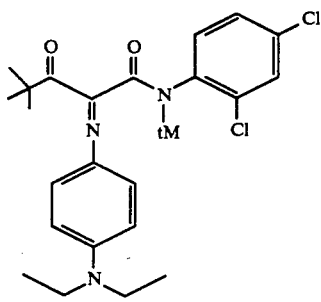

wherein tM represents a thermally migratable acyl group.

17. A heat-sensitive recording element as defined in claim 16 wherein tM is selected from —COCH$_3$, —CO$_2$CH$_2$Ph and —CO$_2$C$_2$H$_5$.

18. A heat-sensitive recording element as defined in claim 11 which comprises at least two layers containing a leuco dye, and additionally containing a thermal isolating layer between adjacent layers of leuco dye.

19. A heat-sensitive recording element as defined in claim 18 wherein an infrared absorber is associated with each said layer of leuco dye.

20. A method of thermal imaging which comprises heating imagewise a heat-sensitive element comprising a support carrying at least one layer of a leuco dye having the structural formula:

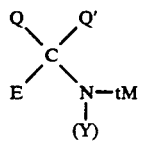

wherein:
E represents a thermally removable leaving group;
tM represents a thermally migratable acyl group;
Q, Q' and C taken together represent a dye-forming coupler moiety wherein C is the coupling carbon of said coupler moiety; and
(Y) taken together with N represents an aromatic amino color developer moiety,
one of said Q, Q' and (Y) containing an atom selected from the atoms comprising Group 5A/Group 6A of the Periodic Table, said groups E and tM maintaining said leuco dye in a substantially colorless form until the application of heat causes said group E to be eliminated from said leuco dye and said group tM to migrate from said N atom to said Group 5A/Group 6A atom thereby forming a dye represented by

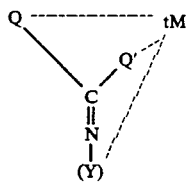

wherein said dotted lines indicate that said tM group is bonded to said Group 5A/Group 6A atom in one of said Q, Q' and (Y).

21. A method of thermal imaging as defined in claim 20 wherein said Group 5A/Group 6A atom is selected from a nitrogen atom, oxygen atom and sulfur atom.

22. A method of thermal imaging as defined in claim 20 wherein an infrared absorber is associated with each layer of leuco dye for absorbing radiation at wavelengths above 700 nm and transferring said absorbed radiation as heat to said leuco dye, said layer being heated imagewise by imagewise exposure to infrared radiation at a wavelength strongly absorbed by said infrared absorber.

23. A method of thermal imaging as defined in claim 20 wherein said leuco dye has the structural formula

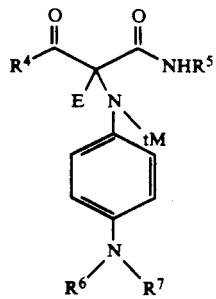

wherein $R^4$ is a t-butyl group or other group having a quaternary carbon atom bonded to the ketone carbonyl function; $R^5$ is phenyl, unsubstituted or substituted with one or more groups selected from alkyl, alkoxy, nitro, halo such as chloro, and carbonamido; E is a thermally removable leaving group; tM is a thermally migratable acyl group; and $R^6$ and $R^7$ are selected from hydrogen and lower alkyl groups containing 1 to 6 carbon atoms, said thermally migratable acyl group and said thermally removable leaving group maintaining said leuco dye in its colorless form until the application of heat causes the elimination of the thermally removable leaving group and the migration of the thermally migratable acyl group to the N containing H and $R^5$ whereby said leuco dye is converted into a novel image dye represented by the structural formula

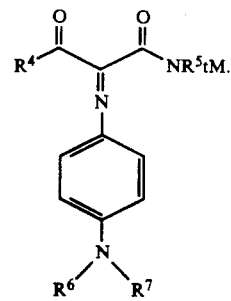

24. A method of thermal imaging as defined in claim 23 wherein said leuco dye has the structural formula

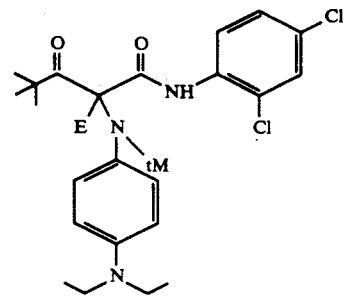

which is converted into the image dye having the formula

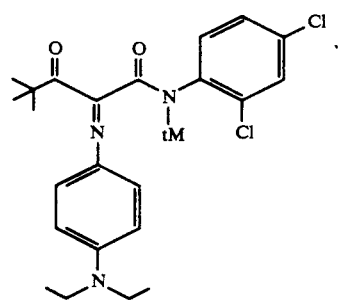

wherein tM represents a thermally migratable acyl group.

25. A method of thermal imaging as defined in claim 24 wherein tM is selected from —COCH$_3$, —CO$_2$CH$_2$Ph and —CO$_2$C$_2$H$_5$.

* * * * *